April 13, 1937.  T. ZUSCHLAG  2,077,161
MAGNETIC ANALYSIS METHOD
Filed March 23, 1934

INVENTOR
Theodor Zuschlag
BY
ATTORNEYS

Patented Apr. 13, 1937

2,077,161

UNITED STATES PATENT OFFICE 2,077,161

MAGNETIC ANALYSIS METHOD

Theodor Zuschlag, Englewood, N. J., assignor to Magnetic Analysis Corporation, Long Island City, N. Y., a corporation of New York Application March 23, 1934, Serial No. 716,942

8 Claims. (Cl. 175—183)

This invention relates to magnetic analysis and has for an object the provision of an improved apparatus for magnetic analysis. More specifically, the invention contemplates improved compensation of forces which tend to interfere in the determination of metallurgical or physical properties of magnetizable bodies.

According to one practice in the heretofore customary art of magnetic analysis, a specimen to be tested and a standard magnetizable body whose metallurgical or physical products are known, are simultaneously subjected to the influence of primary fluctuating electromagnetic fields produced by a common source of alternating current. A pair of substantially identical secondary coils are placed in inductive relationship with the standard and the specimen respectively, and are connected in series opposition with an indicating means so that the induced differential current in the two secondary coils may be measured and taken as a criterion to establish the differences in metallurgical or physical properties between the specimen and the standard. This type of practice may well be described as a comparative system of magnetic analysis in which alternating current is used. In such practice, amplitude, frequency, phase and wave forms of the induced differential current are indicative of certain properties whose presence or absence is sought to be determined.

Comparative methods of magnetic analysis are particularly suited to the comparison of specimens whose magnetic characteristics are closely similar. In practice, however, particularly when carrying out investigations for industrial purposes, this condition is not always realized. Frequently the differences between specimens are of such magnitude that the limit of the indicating means is exceeded. In such a case two courses are open. The sensitivity of the instrument may be reduced to keep the reading within the scale of the indicator, or compensation of the difference may be resorted to. For obvious reasons, reduction in sensitivity is seldom desirable, and compensation of the differences is the desirable alternative. The chief purpose of this invention is the compensation of differences between specimen and standard which tend to interfere in the determination of metallurgical or physical properties of the magnetizable bodies under investigation.

In the ideal case, the various parts of the apparatus are so constructed and disposed with respect to each other that electromagnetic forces created in them do not interfere with each other. In the case of apparatus suitable for industrial purposes, however, stray currents, variations in supposedly identical parts of equipment, unsymmetrical disposition of wiring and other factors lead to the presence of extraneous forces that tend to mask the true differences sought, and vitiate in large measure the accuracy of results.

For this reason it is necessary in the case of practical working apparatus to employ means whereby both variations between specimens and the effect of extraneous forces may be compensated for or eliminated in order that the results obtained shall be accurate and shall offer a true basis for the determination of the physical or metallurgical properties whose presence is to be discovered.

As a result of my investigations I have discovered that by means of a novel bridge network in a magnetic analysis circuit such as has been described I am able to compensate for, or neutralize, the effect of both variations between specimen and standard and the extraneous forces whose presence in the secondary circuit tends to obscure or vitiate the true differences between the properties of the specimen and the standard under investigation.

In another aspect, my invention contemplates the suppression of harmonics whose presence tends to confuse rather than to simplify results, so that the resulting induced differential current of the secondary circuit may be measured by simple indicating means such as galvanometers. In this way a true indication of the differences in metallurgical or physical properties between standard and specimen may be obtained with great accuracy and by a simple mode of operation. The apparatus of my invention, in addition to permitting greater accuracy of measurements, is rugged in construction and suitable for the severe conditions which are met in the industrial applications of magnetic analysis. The mode of operation is sufficiently simple that extremely accurate results may be obtained by relatively inexperienced operators. A further advantage is presented in that the indicating devices applied may be relatively simple in form, and delicate apparatus such as oscillographs are no longer required to obtain accurate results. The data obtained is relatively easy to interpret, an outstanding advantage in the case of commercial magnetic analyses in which a large number of specimens are examined.

My invention will be better understood by referring to the accompanying drawing, in which.

Figure 1:
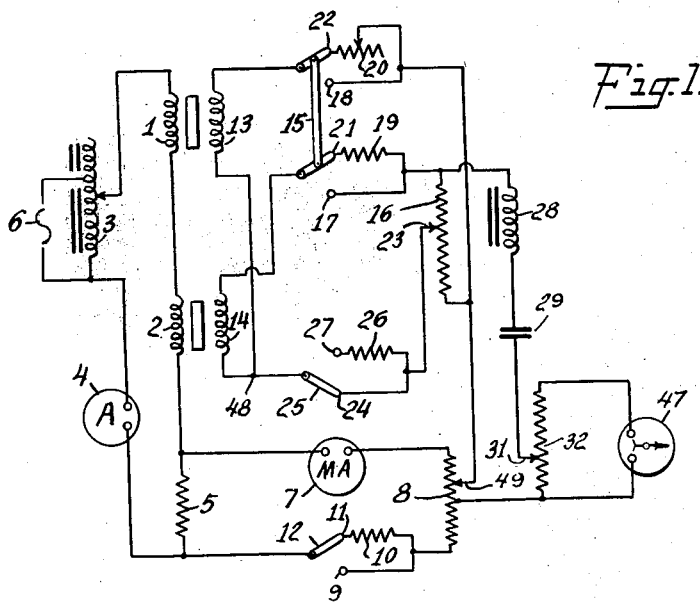
Fig. 1 is a presently preferred form of magnetic analysis apparatus in which is incorporated a novel compensating net-work of my invention.

Referring to Fig. 1, it will be observed that two substantially identical primary coils, 1 and 2, of relatively low ohmic resistance are connected in series with a voltage supply transformer 3, an ammeter 4, and a low ohmic noninductive fixed resistance 5. The primary coils are preferably constructed of a suitable number of turns of insulated copper wire of low ohmic resistance. The voltage supply transformer is preferably of the adjustable auto-transformer type. The input leads of the transformer are connected to a suitable alternating current source 6.

A pair of substantially identical secondary coils 13 and 14, preferably composed of a suitable number of turns of insulated copper wire of low ohmic resistance, are connected in series opposition to the contact arms of a double-pole three-position switch 15. The pair of secondary coils are disposed in inductive relationship with the primary coils, preferably by placing each secondary coil within a primary coil in axial alignment therewith. By connecting the two poles of switch 15 to contact points 17 and 18 the two secondary coils are connectible directly to the end points of a potentiometer 16. Placing the double-pole switch on the contact points 21 and 22 serves to connect the secondary coils in series with the fixed resistor 19, the end points of potentiometer 16 and the variable resistor 20. By means of the single-pole triple-throw switch 25, the slider 23 of the potentiometer 16 is connectible through contact point 24 to a point on the direct wire between the secondary coils, this point being hereinafter referred to as the common point 48. The slider 23 of potentiometer 16 may also be connected to the common point 48 through fixed resistance 26 and contact point 27 of switch 25.

One end of the fixed resistor 5 of the primary circuit is connected in series with the milliammeter 7 to an end of a center tap potentiometer 8. The other end of fixed resistor 5 is connectible to the other extremity of potentiometer 8 through a single-pole double-throw switch 12, either directly through contact point 9, or in series with a fixed resistance 10 through contact point 11.

The slider 49 of center tap potentiometer 8 is connected to an end of potentiometer 16, this end of potentiometer 16 being also connectible through contact points 18 or 22 to the secondary coils as has been described above. The other end of potentiometer 16, in addition to being connectible with the secondary coils through contact points 17 or 21, is connectible in series with an inductance 28 and a capacitance 29 to the slider 31 of a potentiometer 32. The inductance 28 and capacitance 29 serve the function of a filter and are preferably constructed to pass only the first harmonic of the primary circuit, but may, if desired, be constructed to pass the third or any other harmonic.

The center tap of potentiometer 8 is connected in parallel with a suitable current indicating means 47 and an end of potentiometer 32, the other end of potentiometer 32 being connected in series to the second lead of the indicating means.

The functions of the various parts of the apparatus may be understood more easily by considering the various modes of operation in connection with the drawing. In all cases the secondary coils 13 and 14 are first tested for balance with no magnetizable bodies inserted in the fields of the primary and secondary coils. To accomplish this, switches 12 and 25 are placed in the center or off position and switch 15 is closed over contact points 17 and 18. With the apparatus connected in this manner the potentiometer 16 is connected across the secondary coil circuit but slider 23 is not connected to the common point 48 of the circuit, so that any voltage drop across the potentiometer must be due to unequal electromotive forces induced in the secondary coils. A voltage drop across potentiometer 16 causes current to flow in the circuit 16, 28, 29, 31, 32, 8 and 49, which is a closed circuit depending for energization upon the current flows in the several potentiometers. The existence of any current flow in this circuit is immediately indicated by a deflection of the indicator 47, which shows the voltage imposed between slider 31 and the common end of the potentiometer 32. It should be observed that in the case of properly designed secondary coils which are located coaxially with respect to the primary coils, the resultant deflection of the indicator should be small.

In order to compensate for any deflection of the indicator, switch 25 is closed on contact point 24, thus connecting coils 13 and 14 in bridge relationship with the potentiometer. This bridge arrangement permits a variation of the ratio of the secondary currents induced in coils 13 and 14. Thus the strength of the secondary potentials in these coils may be varied by adjusting slider 31 of potentiometer 32, while an adjustment of slider 23 of potentiometer 16 permits a reduction in the strengths of the potentials induced in the secondary coils to minimum values. In many instances, however, the minimum value attainable by the adjustment of potentiometer 16 is not zero, and in order to obtain a zero reading of the indicator it is necessary to close switch 12 to either of the two contact points 10 and 9 and adjust the slider 49 of potentiometer 8. It will be observed that the auxiliary drop thus imposed across potentiometer 8 between the center tap and the slider 49, is substantially 90° out of phase with the open circuit air core potentials of the secondary cores. This is due to the source of this potential drop in the primary circuit. Secondary phase components in the secondary coil circuit which are so disposed as to be unaffected by adjustment of potentiometer 16, may be neutralized by means of the 90° phase displaced drop of the potentiometer 8.

The range of compensation obtainable by potentiometers 8 and 16 may be varied by inserting resistances 10 and 26 into their respective circuits by means of switches 12 and 25, and this increased range of compensation is obtained without altering the sensitivity of the apparatus to an appreciable degree. It should be understood that while the resistors 10 and 26 are not absolutely essential to the operation of the compensating net-work, they are desirable adjuncts because of the additional range of compensation which they provide. Usually in the case of air core testing such as has been described, a well designed apparatus will require little compensation and zero readings will be obtained with the sliders close to the midpoints of potentiometers 16 and 8.

When the indicator reads zero with no magnetizable bodies in the field of primary and secondary coils the compensation of extraneous forces has been effected. If the difference in the magnetic characteristics of specimen and standard are small, as is usually the case when comparing samples from the same heat, the following procedure is followed.

The sliders of the potentiometers 8 and 16 are left unchanged from the position which they occupied when the indicator showed zero reading for air core conditions. A standard A of known properties is inserted in the field of one pair of primary and secondary coils, say 1 and 13, and a specimen B, whose properties are to be determined, is inserted in the field of the other pair of primary and secondary coils, say 2 and 14. The indicator will be deflected in proportion to the differences in the magnetic properties of the standard and the specimen. The reading of the indicator is noted. If several specimens are to be tested these are substituted successively for specimen B in the coils, and the deflection corresponding to each specimen is noted. These readings are indicative of the differences in metallurgical or physical properties between specimen and standard, or between specimens themselves.

When specimens and standard differ so markedly in magnetizable characteristics as to cause a deflection which is too great to be read on the scale of the indicator, as is frequently the case when specimens and standard represent different heats of metal, or when either specimens or standard contain flaws of considerable magnitude, the testing procedure is somewhat different. The change in procedure is made necessary by the fact that the setting of potentiometer 16 for a zero reading under air core conditions must be changed in order to accommodate the reading upon the scale of the indicator. The procedure in such a case is as follows:

A standard A and a specimen B are inserted in the field of the coils as previously described, and the resultant deflection of the indicator is reduced to zero by adjustment of the potentiometers 8 and 16. The settings of the potentiometers 8 and 16 are noted. Specimen B is replaced by a second specimen C and the potentiometers 8 and 16 are again adjusted until a zero reading is obtained. The settings of the potentiometers for specimen C are noted. A comparison of the settings for the two cases serves as a basis for differentiating specimens B and C, insofar as their magnetic characteristics are concerned. It will be observed that this method of procedure, while producing results which are as trustworthy as those obtained in the previous method, is considerably slower because it requires considerable manipulation. For this reason it is preferable to choose a standard whose magnetizable characteristics approximate those of the specimens to be tested, especially in the case of quantity production.

The procedures thus far described find their chief utility in the qualitative testing of steel specimens where one or more defects of a particular kind are sought to be discovered by comparison with a standard in which these defects do not occur. The utility of the apparatus is not limited, however, to qualitative determinations. The apparatus may also be used to establish a quantitative comparison of magnetizable bodies in that the total magnetic loss difference and the ratio of the apparent permeabilities of two samples may be quantitatively determined with a high degree of accuracy. The procedure, in the event that these quantities are sought, is as follows:

The two samples to be compared are inserted respectively into the pairs of secondary and primary coils. The circuit is then balanced by adjusting potentiometers 8 and 16 to obtain complete neutralization, when the indicator will register zero. When this condition is obtained it is necessary to determine the value of the resistance of the section of potentiometer 8 between the center tap and the slider. Ordinarily, in the case of a graduated potentiometer this is a matter of simple reading. It is also necessary to determine the root-mean-square value of the current flowing through the potentiometer 8. Having determined these values for a balanced condition, the determination of total loss differences is simply a matter of substituting the values in the following equation and solving it for W; i. e.

$$W = i^2 r$$

where; W is the total magnetic loss difference between the two samples, expressed in watts.

$i$ is the effective current flowing in potentiometer 8 in amperes and, $r$ is the resistance between the center point of the potentiometer 8 and the slider 49, in ohms.

The determination of the permeability ratio is somewhat more complicated than the determination of the total loss difference between the samples. It is based upon the determination of ratio of the secondary potentials induced in coils 13 and 14. In order to determine this potential ratio, two successive compensations, for slightly different circuit conditions, are necessary. These two compensations are accomplished in the following manner:

The samples to be compared are inserted in the fields of the secondary coils. The contact arms of the switch 15 are connected to contact points 17 and 18 and the contact arm of switch 25 is connected to the contact point 24. With the apparatus in this condition the potentiometers 8 and 16 are adjusted so that the indicator reads zero. The condition of the circuit may be mathematically expressed as follows, where:

$E_{13}$ is the electromotive force induced in coil 13;

$E^{14}$ is the electromotive force induced in the coil 14;

$I_{13}$ equals the resultant current;

$I_{14}$ equals the resultant current in secondary coil 14;

$b$ is equal to the resistance between contact point 17 and slider 23 of potentiometer 16;

$r_{14}$ equals the resistance of secondary coil 14; the other resistances being indicated by small letter $r$ and index number corresponding to the number of the apparatus on Fig. 1. The following equations then obtain:

(1) $\quad I_{14} = E_{14}(r_{14}+b)$
(2) $\quad I_{13} = E_{13}[r_{13}+(r_{16}-b)]$
(3) $\quad I_{14}b = I_{13}(r_{16}-b)$ Substituting the values of $I_{14}$ and $I_{13}$ from Equations 1 and 2 in Equation 3:

(4) $\quad \dfrac{E_{13}}{E_{14}} \dfrac{r_{16}-b}{b} = \dfrac{r_{14}+b}{r_{13}+(r_{16}-b)}$ It will be noted that Equation 4 contains the unknown impedances $r_{14}$ and $r_{13}$ which must be eliminated before the numerical value of the ratio $E_{14}/E_{13}$ can be calculated. In order to accomplish this elimination it is necessary to obtain a second series of values for another compensated condition. This second compensation procedure consists in reversing switch 15 and placing it in contact with points 21 and 22 so that the fixed resistor 19 and the variable resistance 20 are inserted in the circuit. The circuit is then compensated by adjusting the resistance 20 without changing the adjustment of the potentiometer 16. New current values will naturally be obtained in the secondary coils. These new current values are designated in the following equations as $I_{14}'$ and $I_{13}'$. The other values are designated as in the previous Equations 1, 2, 3 and 4:

(5) $\quad I_{14}' = E_{14}(r_{14}+r_{19}+b)$ (6) $\quad I_{13}' = E_{13}[r_{13}+r_{20}+(r_{16}-b)]$ (7) $\quad I_{14}'b = I_{13}'(r_{16}-b)$ These equations may be combined as follows:

(8) $\quad \dfrac{E_{13}}{E_{14}} \dfrac{r_{16}-b}{b} = \dfrac{r_{14}+r_{19}+b}{r_{13}+r_{20}+(r_{16}-b)}$ Equations 4 and 8 may now be combined to obtain the ratio of the induced potentials in coils 13 and 14 in the following manner:

(9) $\quad \dfrac{E_{13}}{E_{14}} = \dfrac{b}{r_{16}-b} \times \dfrac{r_{19}}{r_{20}}$ It will be observed that Equation 9 contains no unknown factors since the values $b$, $r_{16}$, $r_{19}$ and $r_{20}$ are known. The numerical value of the equation may therefore be easily computed. Knowing this value it is possible to compute, by means well known in the art, the ratio of the apparent permeability of the tested specimens.

In conducting tests with the apparatus of my invention it is preferable that an efficient filter combination 28, 29 be used. It is not essential that a filter of the particular type shown be employed, but whatever the type of filter, the aim is to eliminate all but one harmonic of the base frequency in order to suppress harmonics whose presence do not aid in the determination of magnetic characteristics. It has been found that most defects and properties which are sought to be determined by magnetic analysis appear in the first and third harmonics of the base frequency. Accordingly filters adapted to pass only one of these two frequencies are preferable. It should be noted, however, that the apparatus is not limited to an investigation of the basic and third harmonics of the exciter current. Occasionally it may be desirable to investigate other harmonics, and this may be easily accomplished by changing the inductance and the capacitance of the filter 28, 29.

An outstanding advantage accures to the use of the compensating means of this invention when it is employed in combination with the two-component indicator of the invention which is described in my co-pending U. S. application, Serial No. 716,941, filed March 23, 1934.

Figure 2:
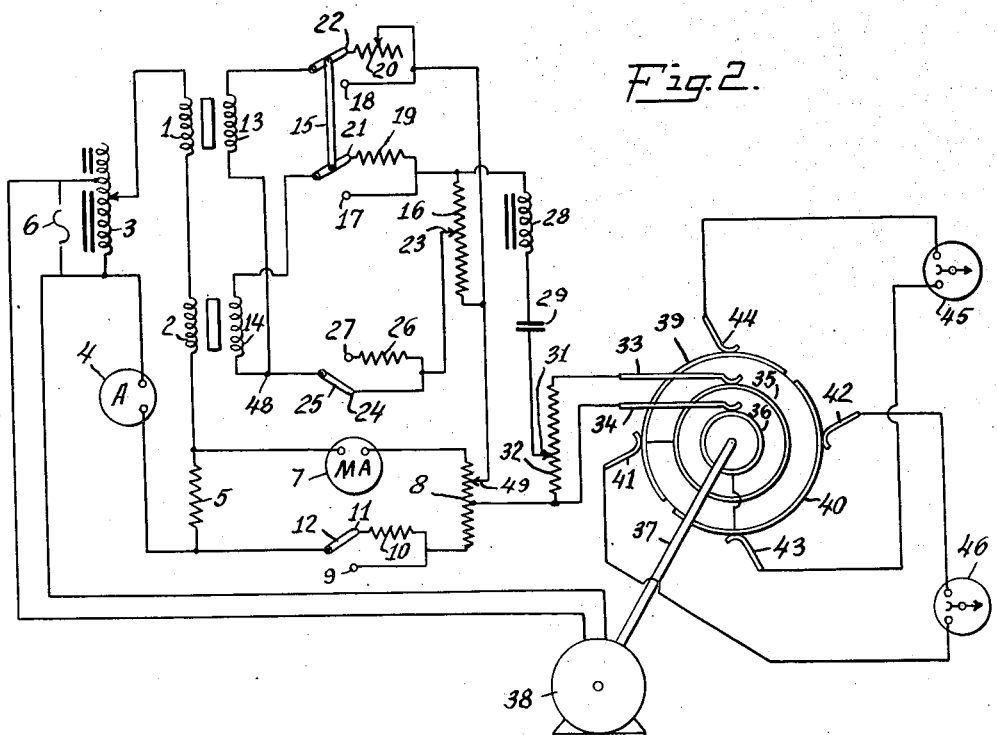
Fig. 2 is a further refinement of the magnetic analysis apparatus of my invention in which is incorporated both the novel compensating network described herein and the wave analysis mechanism shown in my co-pending application, Serial No. 716,941 filed March 23, 1934.

Fig. 2 shows a compensating magnetic analysis circuit incorporating both the compensating means described and the two-component indicator of my aforementioned application. It will be observed that this two-component indicator has been substituted for the indicating means 47 shown on Fig. 1. A synchronous motor 38 derives power from the current source 6 ahead of the autotransformer 3, and is operably associated with commutator 37. The ends of the potentiometer 32, previously referred to in the description of Fig. 1, are connected to brushes 34 and 33, the brushes being in contact with contact rings 35 and 36, respectively, of the synchronous commutator 37. When the synchronous motor 37 is of the two-pole type the commutator 37 is equipped with two separate contact segments 39 and 40 which are connected to the contact rings 35 and 36, respectively. Two pairs of diagrammatically opposed brushes 41, 42, and 43, 44 are symmetrically disposed upon the contacts 39 and 40 and are connected to two D'Arsonval type galvanometers 45 and 46. The two brush pairs are 90° phase displaced and may be moved in unison along contact segments 39 and 40.

When this two-component type of indicator is used the potential drop between the two ends of potential 32 may be divided into two components which are 90° phase displaced with respect to each other. The voltage drop between slider 31 and the one end of the potentiometer 32 is transferred to contact rings 36, 35 and return to the contact segments 39, 40. The brush pairs 41, 42 and 43, 44 receive the rectified voltage from the contact segments and deliver it to the indicators 45 and 46. In other words, the voltage wave of the one complete cycle is broken up into two currents 90° phase displaced, integrated and indicated with regard to their arbitrary origins. The simultaneous indication of the two phase displaced components permits the reconstruction of the voltage wave, a feature which normally may be accomplished only with the help of an oscillograph.

It will be apparent that when carrying out tests with the apparatus, including the two-component indicator, it is essential to use an efficient filter combination 28, 29, in order to pass only the harmonic which is being investigated. In order to further describe the process involved in my new apparatus and method for magnetic testing in which a two-component indicator is used in conjunction with the compensating means which has been described, the following is set forth:

Currents induced in secondary coils 13, 14 are compensated first by connecting the coils in series opposition, and second, by adjusting the slider of potentiometer 16. The resultant differential current, which is not necessarily in phase with the primary current, may be completely neutralized by an auxiliary potential obtained by adjusting the slider of potentiometer 8. The state of complete neutralization is indicated by zero readings on the two indicators which are connected in series with the segments of commutator 37. The commutator serves to break up the cycle differential current into two 90° phase displaced currents which are separately integrated and shown by the indicators. True neutralization is obtained only when both the indicators read zero. By means of the two-component indicator it is possible to reconstruct the wave form of the differential current in a manner which previously was impossible without the use of oscillographs.

When the two-component indicator is used in conjunction with the compensating net-work of my invention it is possible to determine by means of one indicator the presence of a total loss difference and its magnitude, while the companion indicator will reflect the ratio of the potential differences induced in the two secondary coils. Investigation has shown that the readings of the two indicators may be well calibrated by comparing them with the potentiometer readings, so that actuate values of both potential ratio and total loss difference may be determined directly on the indicators.

I claim:

1. The method of magnetic analysis which comprises setting up alternating fluxes in a primary circuit by means of alternating current, inducing two secondary currents in a secondary circuit placed in inductive relationship with said primary circuit, opposing said currents in the secondary circuit, neutralizing the resultant differential current in said secondary circuit by varying the resistance thereof and by introducing thereinto an auxiliary primary current in phase with the primary current, inserting a standard of known magnetism affecting properties and a specimen to be tested in inductive relationship with the secondary circuit, breaking up the resultant secondary current into two components and integrating the two components.

2. Method according to the preceding claim in which the secondary current resulting from the insertion of standard and specimen in inductive relationship with the secondary circuit is filtered to suppress all but one harmonic.

3. The method of magnetic analysis which comprises inducing an alternating flux in a standard of known magnetism affecting properties and in a specimen to be tested by means of a common alternating current source, utilizing said fluxes to induce secondary currents in a secondary circuit placed in inductive relationship with said specimen and said standard, opposing the secondary currents in said secondary circuit, neutralizing the resulting differential current by varying resistances in said secondary circuit and by introducing thereinto an auxiliary primary current in phase with the primary current source, noting the magnitude of the resistances in the secondary circuit when the neutral current condition prevails, replacing the specimen by a second specimen and again neutralizing the differential current in the secondary circuit by changing the magnitude of the resistances therein and by adjusting the amount of auxiliary current introduced into the secondary circuit, and noting the magnitude of the resistances in the secondary circuit when the second neutral condition prevails.

4. The method of magnetic analysis which comprises simultaneously setting up an alternating magnetic flux in a standard of known magnetizable characteristics and in a specimen to be tested by means of a primary alternating current, inducing two secondary currents in a secondary circuit placed in inductive relationship with said specimen and said standard, opposing the secondary currents in a secondary circuit, neutralizing the secondary currents in the secondary circuit due to forces other than those which reflect the differences in physical properties of standard and specimen which are sought to be investigated by appropriate adjustment of resistances in the secondary current and by introducing thereinto an auxiliary primary current, filtering out all but one harmonic of the remaining secondary current in the secondary circuit, breaking the remaining harmonic of the secondary current into two 90° phased displaced components, separately integrating said components and noting the integrated components thus obtained.

5. The method of magnetic analysis which comprises establishing two alternating fluxes by means of a primary alternating current, inducing two secondary currents in a secondary circuit disposed in inductive relationship with the alternating fluxes, opposing said secondary currents in the secondary circuit, neutralizing the resultant differential current in the secondary circuit when no magnetizable bodies are inserted within the fields of the alternating fluxes by varying the magnitude of resistances in the secondary circuit and by introducing primary current into the secondary circuit, introducing a standard of known magnetic properties into the field of one alternating flux and a first specimen to be tested into the field of the other alternating flux, neutralizing the resultant secondary current by varying the resistances of the secondary circuit, noting the magnitude of the resistances in the secondary circuit after adjustment, replacing the first specimen by a second specimen to be tested and again neutralizing the resulting differential current by adjusting the magnitude of the resistances in the secondary circuit, again noting the magnitude of the resistances in the secondary circuit and comparing the magnitude of the resistances corresponding to the first and second specimen.

6. In a method of magnetic analysis in which a primary alternating current is utilized to induce a differential secondary current in a circuit, the improvement which comprises introducing primary alternating current into the circuit, breaking up the resulting current in the circuit into phase displaced components, simultaneously integrating the components and producing the integrated components for inspection.

7. The method of magnetic analysis which comprises setting up an alternating flux in a primary circuit by means of a primary alternating current, inducing a secondary current in a secondary circuit placed in inductive relationship with said primary circuit, neutralizing the secondary current by introducing into the secondary circuit an auxiliary primary current in phase with the primary current, then inserting a specimen to be tested into inductive relationship with the secondary circuit, breaking up the secondary current resulting from the insertion of the specimen into inductive relationship with the secondary circuit into phase displaced components, simultaneously integrating the components and producing the integrated components for inspection.

8. In a method of magnetic analysis in which a primary alternating current is utilized to induce a differential secondary current in a secondary circuit, the improvement which comprises introducing an auxiliary alternating current in phase with the primary alternating current into said secondary circuit while no magnetizable bodies are inductively associated with the secondary circuit, thereby neutralizing the current in the secondary circuit, then inductively associating a magnetizable body with the secondary circuit, breaking up the resulting secondary current into phase displaced components, simultaneously integrating the components and producing the integrated components for inspection.

THEODOR ZUSCHLAG.